United States Patent
Holybee et al.

[15] 3,645,698
[45] Feb. 29, 1972

[54] SAMPLING APPARATUS

[72] Inventors: Leslie D. Holybee, Cupertino; Henry Faigh, Sunnyvale; Robert B. Samuels, Menlo Park, all of Calif.

[73] Assignee: Beckman Instruments, Inc.

[22] Filed: Oct. 6, 1969

[21] Appl. No.: 863,873

[52] U.S. Cl. .................23/253 R, 23/259, 23/292, 222/365
[51] Int. Cl. ........................................G01f 11/10
[58] Field of Search .................23/253, 259, 292

[56] References Cited

UNITED STATES PATENTS 1,974,789  9/1934  Angell.............................222/365 X
2,020,916  11/1935  Still..................................222/365 X
3,487,695  1/1970  Haunschild et al................23/253 UX

FOREIGN PATENTS OR APPLICATIONS 1,168,657  4/1964  Germany.........................222/365

Primary Examiner—Morris O. Wolk
Assistant Examiner—R. M. Reese
Attorney—Richard M. Jennings and R. J. Steinmeyer

[57] ABSTRACT

An apparatus for monitoring the progress of a peptide synthesis process being carried out in a closed reaction vessel including a slidable member having a plurality of pockets for trapping small aliquots of peptide-resin cooperating with the interior of the reaction vessel for selectively removing samples of peptide-resin without exposing the interior of the reaction vessel to the surrounding environment.

9 Claims, 3 Drawing Figures

PATENTED FEB 29 1972 3,645,698

INVENTORS
LESLIE D. HOLYBEE
ROBERT B. SAMUELS
HENRY C. FAIGH
BY Richard M. Jennings

SAMPLING APPARATUS

BACKGROUND OF THE INVENTION

1. Field of the Invention

The present invention relates in general to peptide synthesis and more particularly to an apparatus for monitoring the course of a solid-phase synthesis of a peptide without exposing the interior of the reaction vessel in which the peptide synthesis is taking place to the surrounding environment.

2. Description of the Prior Art

Numerous methods and techniques are presently employed to chemically synthesize peptides and polypeptides. One of these methods is commonly referred to as solid-phase peptide synthesis (SPPS) and, generally speaking, involves the stepwise addition of protected amino acids to a growing peptide chain which is bound by a covalent bond to an insoluble solid support. More specifically, solid-phase peptide synthesis includes the steps of attaching the C-terminal of an amino acid residue to an insoluble copolymeric resin, and subsequently adding further amino acids by repeating a cycle of defined reaction steps and rinses thereby causing formation of an amino acid chain—a "peptide"—secured to the resin base. Complete descriptions and discussions of typical solid-phase peptide synthesis processes may be found in the articles entitled "Solid-Phase Peptide Synthesis. I. The Synthesis of a Tetrapeptide" by R. B. Merrifield, Journal of American Chemical Society, 1963, Vol. 85, page 2,149; "Synthesis of Angiotensins by the Solid-Phase Method," by G. Marshall and R. Merrifield, Biochemistry, Vol. 4, page 2,394, 1965; and "Instrument for Automated Synthesis of Peptides" by R. B. Merrifield, et al., Analytical Chemistry, Vol. 38, No. 13, December 1966, page 1905.

During the solid-phase synthesis of the peptide it is often desirable to periodically withdraw from the reaction mixer within the reaction vessel samples or small aliquots of peptide-resin for analysis to monitor the progress or course of the synthesis process. Typically, solid-phase peptide synthesis may require several days (at an addition rate of four to six amino acids per day) and monitoring of the synthesis progress is desirable and indeed mandatory to avoid excessive loss and wasting of expensive reagents and solvents, not to mention the loss of time should the reaction not be proceeding properly.

Heretofore it has been the practice to monitor the synthesis progress by opening the top of the reaction vessel and removing an aliquot of peptide-resin through the opening. Since the resins utilized in the solid-phase peptide synthesis tend to adhere tenaciously to the walls of the reaction vessel, opening the top of the vessel introduces resin particles around the edges of the joint formed between the lid and the reaction vessel. This invariably prevents formation of a liquidtight seal when the cover is replaced thereby permitting reagents and corrosive, malodorous solvents to subsequently escape from the reaction vessel into the atmosphere. Naturally, this inadvertent wasting of needed reagents and solvents tends to prematurely terminate the synthesis process. Moreover, contaminants from the surrounding environment may pass through this loose fitting into the reaction vessel and disrupt the synthesis process.

SUMMARY OF THE INVENTION

The present invention contemplates an apparatus for easily monitoring the progress of a solid-phase peptide synthesis taking place in a reaction vessel without exposing the interior of the reaction vessel to the surrounding environment and losing expensive and valuable reagents and solvents needed to successfully perform the synthetic process. To this end there is provided a slidable member cooperating with the interior of the reaction vessel through a small aperture formed in the wall of the vessel. The slidable member includes one or means for trapping and holding small aliquots of peptide-resin so that samples may be selectively withdrawn by sliding the member into and out of the interior of the reaction vessel.

Accordingly, a primary object of the present invention is to monitor the progress of a solid-phase peptide synthesis process without unnecessary loss of reagents and solvents necessary to complete the reaction.

A further object is the automatic sampling and monitoring of the progress of a solid-phase peptide synthesis process.

A further object is the intermediate storage of a number of small aliquots of peptide-resin for subsequent analysis at a more convenient time.

These and other objects and advantages of the invention will become apparent following the detailed description when read in conjunction with the accompanying drawing in which:

DESCRIPTION OF THE PREFERRED EMBODIMENT

Figure 1:
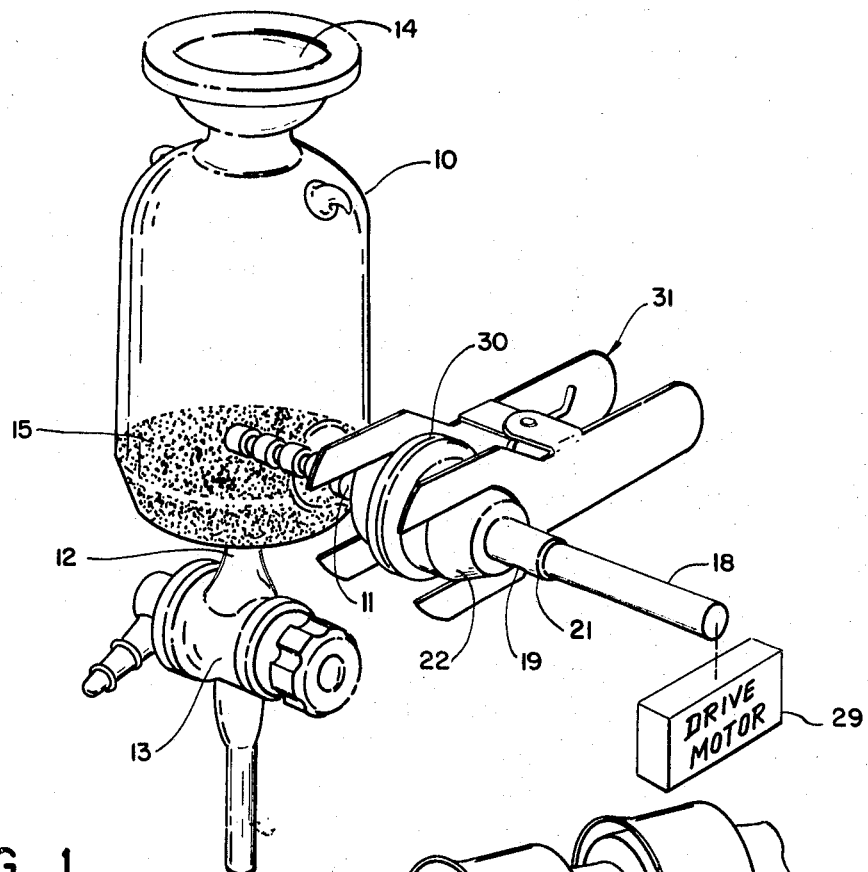
FIG. 1 is an overall, true projection view illustrating the assembled sampling apparatus fixedly mounted to the outside wall of the reaction vessel.

With reference now to the drawings and more particularly to FIG. 1 thereof it will be observed that reference numeral 10 designates the reaction vessel in which the solid-phase peptide synthesis process takes place. Preferably, the reaction vessel is fabricated from a suitable nonreactive material, such as glass. At the bottom of reaction vessel 10 there is provided a tubular conduit or channel 12 communicating with the interior of reaction vessel 10 and through which various solvents and reagents necessary for the synthesis process may be introduced into the reaction vessel 10. Tubular conduit 12 includes a stopcock 13 which may be selectively opened and closed. Stopcock 13 is provided to facilitate the removal of reaction vessel 10 from the apparatus for injecting the reagents and solvents (not shown) without loss of reagents from the reaction vessel.

A generally circular fritted glass filter disc 15 is disposed and affixed a short distance above the bottom of reaction vessel 10 for holding the resin-supported amino acids during the synthesis process. Initially resin-supported amino acid is inserted into the interior of reaction vessel 10 by way of a small opening 14 located at the top of reaction vessel 10. Opening 14 is closed by means of a stopper or plug (not shown) which fits tightly in opening 14. Upon completion of the synthesis process the stopper is removed and the final product taken out of the reaction vessel 10 through opening 14.

Figure 2:
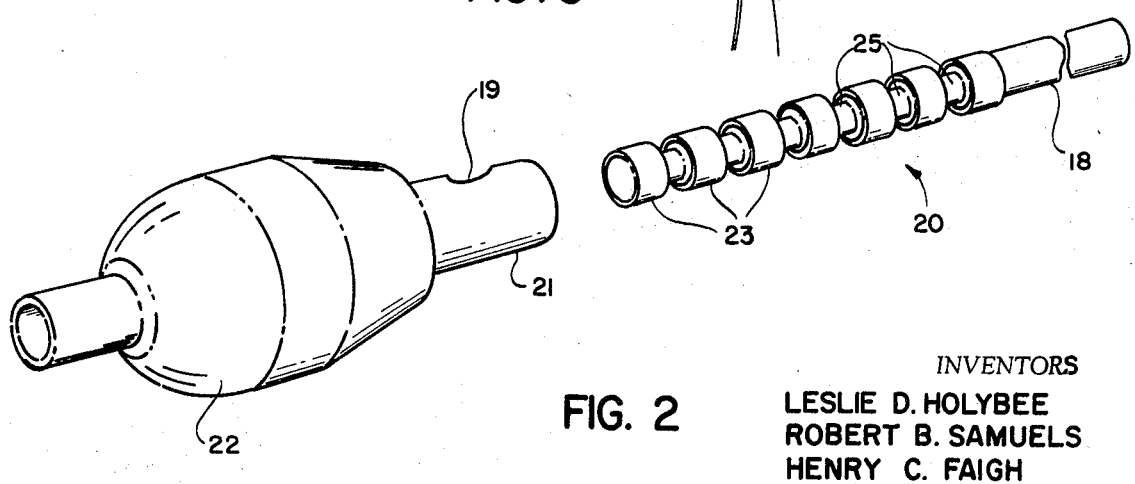
FIG. 2 is an isometric-exploded view of the preferred embodiment of the sampling apparatus in accordance with the principles of the present invention.

As may be best seen in the exploded view illustrated in FIG. 2, the sampling apparatus of the present invention comprises in general a sampling core member 20 slidably inserted in a tubular outer housing 21. A male ball joint 22 located toward the front end of tubular housing 21 fits tightly within a generally conical shaped flange or socket 30, which serves as a female joint, projecting from the outer wall of reaction vessel 10 immediately above fritted glass disc 15 and is fixedly secured or held thereto by a commercially available spring-type ball joint pinch clamp 31 (FIG. 1). Outer housing 21 is preferably fabricated from Teflon with thin-walled, closely fitting sleeves (not shown) fabricated from Kel-F fitted tightly over the outer walls on either side of ball joint 22 to prevent leakage resulting from cold-flowing of the Teflon. A small aperture 19 is drilled through the outer housing at the rear end thereof for purposes to be presently discussed.

Slidable core member 20 includes a plurality of uniform size, relatively thin, circular discs 23 spaced apart from each other a predetermined and equal distance along the longitudinal axis of a small center shaft 18, having a circular cross section, to form a plurality of small compartments or "pockets" 25 in which individual peptide-resin samples or aliquots may be trapped and stored. In the illustrated embodiment each disc 23 has a diameter of around 5 millimeters and a thickness of around 3 millimeters. Each pocket 25 takes the form, geometrically speaking, of a hollow cylinder with its inner diameter defined by the thickness of the center shaft 18, its outer diameter by the diameter of disc 23 and its height by the distance between two successive discs 23.

In the illustrated embodiment core member 20 includes seven discs 23 and a total of six compartments or pockets 25. Of course, it will be appreciated that any number of discs, disc size, or disc spacing may be employed depending upon the number of samples and sample size desired. The only limitation in the number of pockets is that the length (L) of outer tubular housing 21 should be greater than the distance (d) between the first and last disc 25 so that when all of the sample pockets 25 have been filled the samples are stored within outer housing 21 for subsequent analysis at the operator's convenience. In practice, both center shaft 18 and discs 23 of core member 20 are fabricated from TFE-Teflon although other suitable nonreactive materials may be used. For automation purposes the end of shaft 18 opposite the sample pockets 25 may be notched, slotted or threaded to accommodate a suitable drive mechanism 29, such as a stepping drive motor.

Figure 3:
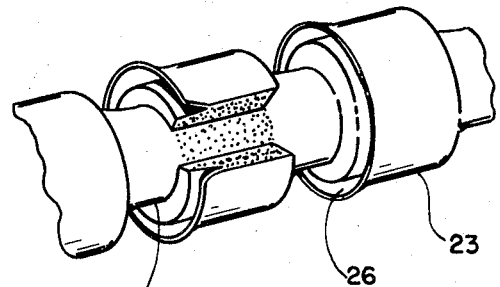
FIG. 3 is an enlarged view showing the liquidtight lipseal.

A small flexible flange 26 best illustrated in FIG. 3, which serves as a lip seal, is formed about the outer circumference of the left-hand edge on each disc 23. This lip seal improves the wiping and sealing action of the disc 23 with the inner wall of tubular housing 21 as sample core member 20 slides back and forth.

In operation the sampling apparatus is attached to the outer wall of reaction vessel 10 as illustrated in FIG. 1 and sampling core member 20 is inserted through small aperture 11 into the interior of reaction vessel 10 so that all six pockets 25 project into the interior of the reaction vessel. When a sample or aliquot of peptide-resin is to be withdrawn the center shaft 18 is manually or automatically moved in an outward direction to pull at least one of the pockets 25 into tubular housing 21 thereby trapping an aliquot of resin-peptide and isolating it from subsequent modification as the synthesis process continues. This sampling of the peptide-resin process is repeated as desired until as many as all six of the illustrated pockets 25 contain peptide-resin aliquots. Then, at a convenient time, the operator may manually or automatically move center shaft 18 further outward in steps bringing each pocket 25 into alignment with small aperture 19 located at the rear end of tubular housing 10. Once each pocket 25 is aligned with aperture 19 an organic solvent rinse is passed through the aperture 19 to wash out the peptide-resin aliquots into pretarred vessels (not shown) for subsequent solvent removal, accurate weighing, hydrolysis or other analysis. Simultaneously, with the removal of the resin-peptide aliquots, the organic solvent serves to wash out and clean each sample pocket 25 to prepare it to receive another sample.

Numerous modifications and departures from the specific apparatus described herein may be made by those skilled in the art without departing from the inventive concept of the invention. Accordingly, the invention is to be constructed as limited only by the spirit and scope of the appended claims.

What is claimed is:

1. An apparatus for monitoring the progress of a peptide synthesis process comprising:
   a closed reaction vessel within which the peptide-synthesis process is performed, said vessel having first and second separate apertures for material inlet and outlet, each of said apertures being provided with closure means; and
   mechanically actuable means independent of said first and second apertures and cooperating with the interior of said reaction vessel for sequentially removing and retaining a series of separate and discrete samples of peptide-resin during the progress of said process without exposing the interior of said reaction vessel to the surrounding environment.

2. An apparatus for sequentially removing and retaining a plurality of samples of peptide-resin from a closed reaction vessel having a small aperture in a wall thereof to monitor the progress of a peptide-synthesis process comprising:
   a tubular housing having a predetermined inner diameter;
   means for fixedly securing said tubular housing to the outer wall of the reaction vessel about said aperture;
   a slidable member slidably disposed within said tubular housing for communicating with the interior of said reaction vessel through the aperture; and
   a plurality of discs secured to and spaced apart predetermined and equal distances along said slidable member to form a plurality of pockets for trapping and removing samples of peptide-resin from the interior of the reaction vessel, each of said discs having a diameter substantially equal to the inner diameter of said tubular housing; and
   said tubular housing extending outside of said reaction vessel for an axial distance which is greater than the distance between the first and last of said discs spaced along said slidable member whereby said samples in said pockets may be retained inside said tubular housing outside of said reaction vessel until all of said samples have been removed.

3. Apparatus as defined in claim 2 comprising in addition means coupled to one end of said slidable member for moving said member in a stepwise fashion to sequentially sample the peptide synthesis process.

4. Apparatus as defined in claim 2 wherein each of said discs includes a flexible lip seal about the outer edge thereof to provide a liquid tight seal with the inner wall of said tubular housing as the slidable member travels therethrough.

5. An apparatus for sequentially securing samples of peptide-resin to monitor the course of a peptide synthesis process comprising:
   a closed reaction vessel within which the synthesis process is performed, said reaction having first and second separate apertures for the inlet and outlet of materials, each of said apertures being provided with closure means, and a third aperture in a wall thereof;
   an external tubular housing secured to an outer wall of said reaction vessel about said third aperture;
   a movable member slidably disposed within said tubular housing and communicating with the interior of said reaction vessel through said third aperture, said movable member being slidable into and out of said reaction vessel and including a plurality of pocket means for selectively and sequentially trapping and removing predetermined size aliquots of peptide-resin from the interior of said reaction vessel; and the length of said tubular housing extending outside of said reaction vessel being greater than the length of that portion of said movable member on which said plurality of pocket means are disposed whereby said samples in said pocket means may be retained in said tubular housing outside of said reaction vessel.

6. Apparatus as defined in claim 5 and comprising in addition means coupled to one end of said movable member for automatically moving said member in a stepwise fashion to sequentially sample the peptide synthesis process during the progress thereof.

7. Apparatus as claimed in claim 5 wherein said means for trapping predetermined size aliquots of peptide-resin comprises a plurality of discs secured to said movable member and spaced apart from each other to form a plurality of pockets for trapping and removing predetermined size aliquots of peptide resin from the interior of the reaction vessel.

8. Apparatus as claimed in claim 7 wherein each of said discs has a generally circular geometrical configuration, said movable member comprises a shaft having a circular cross section, and each pocket is bounded by two successive discs and comprises a hollow cylinder having an inner diameter equal to the diameter of said circular cross sectional shaft, an outer diameter equal to the diameter of said discs, and a height equal to the distance between two adjacent discs, and wherein the length of said tubular housing extending outside of said reaction vessel is greater than the distance between the first and last discs secured to said movable member.

9. Apparatus as claimed in claim 8 wherein said tubular housing includes a small aperture at one end thereof with which each pocket may be successively brought into registration and through which a rinsing solution flows to simultaneously remove the retained sample of peptide-resin from the pocket and wash out the pocket preparing it to receive another sample.

* * * * *